United States Patent

Mueller

[15] 3,675,487
[45] July 11, 1972

[54] SAFETY MECHANISM FOR PRESSURE GAUGE

[72] Inventor: Otto Mueller, 13 Byfield Lane, Dearborn, Mich. 48120

[22] Filed: Sept. 14, 1970

[21] Appl. No.: 71,843

[52] U.S. Cl. ................................. 73/414, 73/392, 137/517
[51] Int. Cl. ............................................................ G01l 7/04
[58] Field of Search ............... 73/412, 414, 392; 137/557, 137/517

[56] References Cited

UNITED STATES PATENTS

| | | |
|---|---|---|
| 2,968,315 | 1/1961 | Fisher ................................. 137/517 |
| 643,876 | 2/1900 | Lane ..................................... 73/392 X |
| 3,354,898 | 11/1967 | Barnes ................................ 137/517 X |
| 2,678,157 | 5/1954 | Pfeifer ................................. 73/392 X |
| 3,367,187 | 2/1968 | Smith et al. ......................... 73/414 X |

*Primary Examiner*—Louis R. Prince
*Assistant Examiner*—Daniel M. Yasich
*Attorney*—Olsen and Stephenson

[57] ABSTRACT

Apparatus for limiting the maximum pressure to which a pressure gauge can be subjected. A spring biased differential pressure valve is maintained in a normally opened position in the inlet fitting of the pressure gauge so that the gauge will be protected from exposure to pressures in excess of its rated capacity.

2 Claims, 3 Drawing Figures

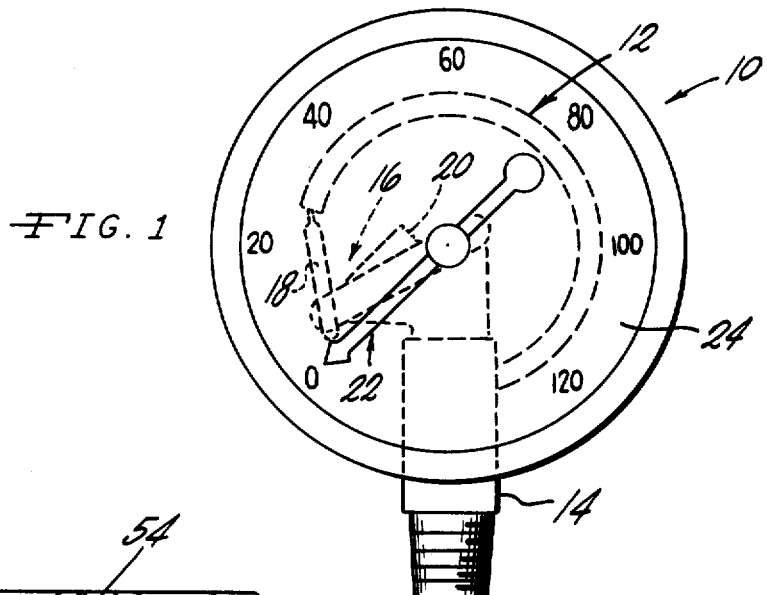
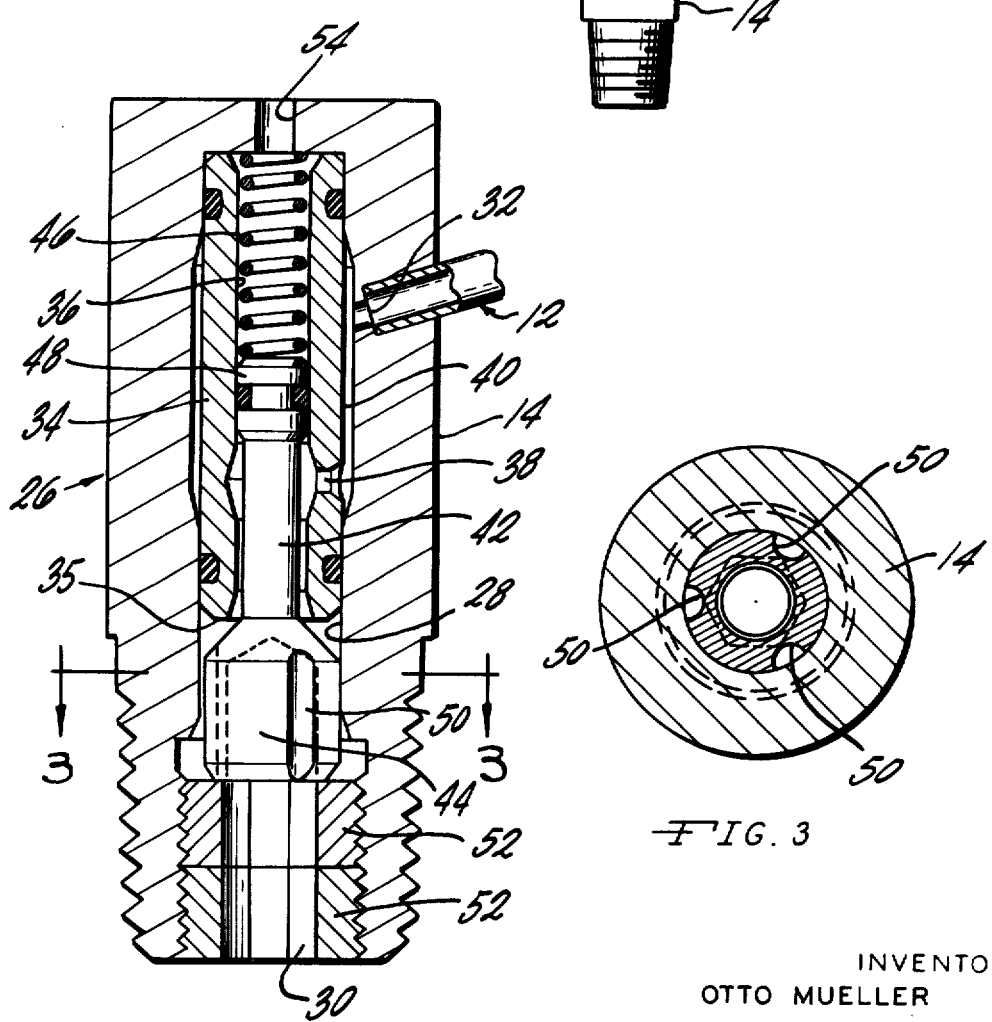

ns
3,675,487

SAFETY MECHANISM FOR PRESSURE GAUGE

BACKGROUND OF THE INVENTION

The present invention relates to pressure gauges which have a hollow element, such as a Bourdon tube, a diaphragm, a bellows or the like, in which a change in the pressure of the fluid therein will cause linear motion of the element, and such linear motion is translated into rotary or other desired motion of a pointer for indicating the pressure of the fluid that is being measured. In particular, the invention relates to an improvement whereby the magnitude of the pressure to which the hollow element of the gauge is exposed is limited so that the components of the gauge will be protected from damage caused by exposure to excessive pressure.

Pressure gauges of the character to which this invention is directed can be purchased at relatively low cost and will function very satisfactorily so long as they are not exposed to excessive pressures. However, such gauges are frequently subjected to such improper treatment, resulting in subsequent inaccurate performances or in complete destruction of the gauge. Under these circumstances, the equipment with which the damaged or destroyed gauge is used may become useless until a new gauge becomes available for replacement purpose. Thus, from a practical or economical standpoint, the harm resulting from the improper use of the gauge may be substantially greater than the mere cost incurred for replacement of the gauge.

In some instances special tools or instruments which require pressure gauges are developed which are intended for relatively widespread use in automobile service stations and the like, and wherein there is a need for keeping the cost of such tools or instruments at a relatively low value. In such circumstances, there is a significant need to provide pressure gauges of the foregoing low-cost type, or adapters for use with such gauges, which are within acceptable low-cost limits so that the costs of the tools or instruments remain relatively low, and also to assure that when used by unskilled personnel, the tool or instrument will not be rendered inoperative by exposure of the gauges to pressures beyond their rated capacity. Safety features of this type are especially needed in conjunction with tools or instruments designed for use with a fluid system in which pressures may be created by manually actuated fluid pumps or pressure guns, and wherein the extent of pressure created in the fluid system is very uncertain.

SUMMARY OF THE INVENTION

The present invention has overcome the inadequacies of the prior art and has provided a relatively low-cost mechanism that can be positioned in the inlet end of a pressure gauge to limit the maximum pressure to which the gauge will be subjected.

According to one form of the present invention, a pressure gauge is provided comprising a passageway, a member movable linearly as a function of the pressure of the fluid in the passageway, a fluid pressure indicator, means coupling the indicator to the movable member for translating the linear movement of the movable member to a pressure indicating movement of the indicator, and a mechanism in said passageway limiting the maximum pressure to which the movable member can be subjected by the fluid in the passageway.

In this form of the invention the mechanism includes a differential pressure valve normally open and responsive to a pressure of preselected magnitude of the fluid in the inlet end of the passageway for moving to a closed position. To accomplish this purpose, the valve is provided with a valve body through which the passageway extends and a valve seat is defined in the passageway facing in the direction of the inlet end. A spool is axially movable in the passageway and has an enlarged head at one end facing in the direction of the inlet end. The spool is movable to a first position wherein the head is spaced from the seat so that the passageway is open and to a second position in which the head is in seated engagement with the seat so that the passageway is closed. A calibrated compression spring is positioned between the spool and the valve body urging the spool to its open position. The head is exposed to the pressure of the fluid at the inlet end so that when the pressure is sufficiently great to overcome the spring pressure, the head will be moved against the preloaded spring pressure to the closed position. By proper selection of the calibrated compression spring the mechanism can be readily adapted for use with any particular pressure gauge having a predetermined rated capacity.

It is one of the objects of the present invention to provide a safety mechanism for use with pressure gauges which will limit the pressure to which the gauge can be exposed.

Other objects of this invention will appear in the following description and appended claims, reference being had to the accompanying drawing forming a part of this specification wherein like reference characters designate corresponding parts in the several views.

BRIEF DESCRIPTION OF THE DRAWING

FIG. 1 is a front elevational view of a pressure gauge embodying one form of the present invention, showing in generally schematic form certain components of the pressure gauge;

FIG. 2 is an enlarged fragmentary vertical section taken through the inlet fitting of the pressure gauge of FIG. 1; and FIG. 3 is a section taken on the lines 3—3 of FIG. 2.

DESCRIPTION OF THE PREFERRED EMBODIMENT

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. The pressure gauge 10 has a Bourdon tube 12 which is connected at one end to the inlet fitting 14, and in the conventional manner, has its other end connected to the gear train 16 comprising the linkages 18, gear segment 20, and a pinion gear (not shown). The pinion gear is in mesh with the gear segment 20 and is drivingly connected to the indicator or pointer 22 for translating the linear motion of the other end of the Bourdon tube to the rotary motion of the pointer 22. Thus, fluid pressure in a system to which the fitting 14 is connected can readily be determined by reading on the dial 24 the pressure as indicated by the pointer 22. However, as explained above, care must be taken that the gauge 10 is not exposed to pressures beyond its rated capacity, otherwise the Bourdon tube 12 or the gear train 16 may be damaged.

The present invention is described in conjunction with the gear-type Bourdon tube pressure gauge 10, but it is to be understood that the invention may be used in conjunction with other types of pressure gauges. Thus, it may be used with a gearless type Bourdon tube gauge or with pressure gauges wherein a diaphragm or bellows produces the linear motion in response to fluid pressure, and such linear motion is translated into the rotary motion of a pointer, or the like, for indicating the magnitude of the pressure.

In the illustrated embodiment of the invention the inlet fitting 14 serves as the valve body for the mechanism 26 which limits the maximum pressure to which the movable member or Bourdon tube 12 can be subjected. The valve mechanism 26 includes the valve body 14 which defines the passageway 28 having an inlet end 30 and an outlet end 32. Located within the passageway 28 is the sleeve 34 which defines the valve seat 35 which faces in the direction of the inlet end 30. It will be observed that the sleeve 34 provides a bore 36 which forms an axial extension of the axially aligned inlet portion of the passageway 28. The sleeve 34 is ported at 38 and is spaced at 40 from the valve body 14 so that the passageway 28 extends from the inlet end 30 axially inwardly for a portion of the length of valve body 14, and then extends into the bore 36 of the sleeve 34, through the port 38, and from there through the space at 40 to the laterally directed outlet 32.

Contained within the valve body 14 is the spool 42 which is axially movable in the passageway and has an enlarged head 44 at its one end facing in the direction of the inlet end 30. The spool 42 is movable to a first position shown in FIG. 2 wherein the head 44 is spaced from the seat 35 so that the passageway is open. The spool 42 is also movable to a second position in which the head 44 is in seating engagement with the seat 35 so that the passageway 28 is closed.

The bore 36 is an axial extension of the inlet end of the passageway 30 and contains the calibrated compression spring 46 which is seated at its one end against the valve body 14 and which is seated at its other end on the other end 48 of the spool 42. As can be seen in FIG. 2, the other end 48 is slidingly fitted in the bore 36, and the head 44 is slidingly fitted in the inlet end portion of the passageway 28. When arranged in this manner, means must be provided to prevent the head 44 from obstructing in its entirety the passageway 28, and for this purpose the head 44 is fluted as at 50, but other suitable arrangements can be provided so that the passageway 28 will be open when the spool is in its first position illustrated in FIG. 2. Lock screws 52 are provided in the inlet end 30 for retaining the spool 42 within the valve body 14. Also, the valve body 14 is vented at 54 so that movement of the spool 42 will be produced either by the action of the compression spring 46 or by the opposing forces resulting from the pressure of the fluid at the inlet end 30 acting upon the effective cross sectional area of the cup-shaped end of the head 44.

In normal operation, the calibrated compression spring 46 will hold the spool 42 by a preselected load in its first or open position shown in FIG. 2 so that the fluid pressure in the inlet end 30 will be transmitted through the passageway 28 to the Bourdon tube or member 12. Should the pressure in inlet end 30 exceed the rated capacity of the gauge 10, the calibrated spring 46 will yield allowing the spool 48 to move axially so that its head 44 is seated against the seat 35, thereby closing the passageway 28 and preventing the pressure of the fluid in inlet end 30 from acting on the Bourdon tube or member 12. As soon as the pressure in the inlet end 30 is relieved, the spring 60 will act to reopen the passage way 28 by moving the spool 42 again to its normal or open position illustrated in FIG. 2.

Thus, a simple, low-cost improvement has been made to the pressure gauge which will avoid damage or destruction of its parts should it be used improperly. The valve mechanism 26 can also be used in an adapter which can be connected to pressure gauges of the type previously in use.

It is claimed:

1. A pressure gauge comprising a passageway, a member movable linearly as a function of the pressure of a fluid in the passageway, a fluid pressure indicator, means coupling the indicator to the movable member for translating the linear movement of the movable member to a pressure-indicating movement of said indicator, and a valve mechanism in said passageway limiting the maximum pressure to which the movable member can be subjected by the fluid in the passageway, said valve mechanism comprising a differential pressure valve normally open and responsive to a pressure of preselected magnitude of the fluid in the inlet end of said passageway for moving to a closed position, said valve including a valve body through which said passageway extends, a valve seat in said passageway facing in the direction of the inlet end, a spool axially movable in said passageway and having an enlarged head at one end facing in the direction of said inlet end, said spool being movable to a first position wherein said head is spaced from said seat so that said passageway is open and to a second position wherein said head is in seating engagement with said seat so that said passageway is closed, a calibrated compression spring operably positioned between said spool and said valve body urging said spool at a preselected load to its first position, said head having an effective cross-sectional area that is responsive to the fluid pressure at said inlet end so that said head will move against said preselected load to its second position when said fluid pressure exceeds a preselected magnitude, said passageway in said valve body having its inlet end axially aligned and its outlet end laterally directed relative to the valve body, and said body containing an inner wall member defining an axial bore that forms an axial extension of the axial aligned portion of said passageway and a side port communicating with said axial bore, said spool having its other end slidingly fitted in said bore and its one end slidingly fitted in the axially aligned portion of said passageway, said outlet end of the passageway passing laterally through a wall in the valve body and communicating with said side port which is between the head end and the other end of said spool, said head having a fluted outer periphery to provide fluid communication through the valve mechanism when the spool is in its first position, said compression spring being positioned in said bore urging said other end of the spool toward its first position.

2. A valve mechanism for the fluid inlet of a pressure gauge comprising a valve body through which a passageway with inlet and outlet ends extends, a valve seat in said passageway facing in the direction of the inlet end, a spool axially movable in said passageway and having an enlarged head at one end facing in the direction of said inlet end, said spool being maintained in a first position wherein said head is spaced from said seat so that said passageway is open and movable to a second position wherein said head is in seating engagement with said seat so that said passageway is closed, a calibrated compression spring operably positioned between said spool and said valve body urging said spool at a preselected load to its first position, said head having an effective cross-sectional area that is responsive to the fluid pressure at said inlet end so that said head will move against said preselected load to its second position when said fluid pressure exceeds a preselected magnitude, said passageway in said valve body having its inlet end axially aligned and its outlet end laterally directed relative to the valve body, and said body containing an inner wall member defining a bore that forms an axial extension of the axial aligned portion of said passageway and a port transverse to said bore in the inner wall member, said spool having its other end slidingly fitted in said bore and its one end slidingly fitted in the axially aligned portion of said passageway, said outlet end of the passageway passing laterally through said wall between the head end and the other end of said spool and communicating with said transverse port, said head having a fluted outer periphery to provide fluid communication through the valve mechanism when the spool is in its first position, said compression spring being positioned in said bore urging said other end of the spool toward its first position.

* * * * *